(12) United States Patent
Hao et al.

(10) Patent No.: US 8,964,146 B2
(45) Date of Patent: Feb. 24, 2015

(54) OPTICAL FILM FOR PREVENTING OPTICAL COUPLING

(75) Inventors: Encai Hao, Woodbury, MN (US);
William Blake Kolb, West Lakeland, MN (US); John A. Wheatley, Lake Elmo, MN (US); Fei Lu, Woodbury, MN (US); Adam D. Haag, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 596 days.

(21) Appl. No.: 13/264,254

(22) PCT Filed: Apr. 14, 2010

(86) PCT No.: PCT/US2010/031019
§ 371 (c)(1),
(2), (4) Date: Oct. 13, 2011

(87) PCT Pub. No.: WO2010/120871
PCT Pub. Date: Oct. 21, 2010

(65) Prior Publication Data
US 2012/0038850 A1    Feb. 16, 2012

Related U.S. Application Data

(60) Provisional application No. 61/169,549, filed on Apr. 15, 2009.

(51) Int. Cl.
G02F 1/1335 (2006.01)
F21V 8/00 (2006.01)

(52) U.S. Cl.
CPC ............ *G02B 6/0011* (2013.01); *G02B 6/0088* (2013.01); *G02F 1/133606* (2013.01)
USPC .............................................. 349/62; 349/63

(58) Field of Classification Search
USPC ............................ 349/61, 62; 359/352, 452
See application file for complete search history.

(56) References Cited

U.S. PATENT DOCUMENTS 3,712,706 A    1/1973 Stamm
3,924,929 A   12/1975 Holmen
(Continued)

FOREIGN PATENT DOCUMENTS

EP    0142250    5/1985
EP    1450202    8/2004
(Continued)

OTHER PUBLICATIONS

ASTM Designation: D 1003-00, "Standard Test Method for Haze and Luminous Transmittance of Transparent Plastics", 2000, pp. 1-6.
(Continued)

*Primary Examiner* — Huyen Ngo
(74) *Attorney, Agent, or Firm* — Robert S. Moshrefzadeh; Lisa P. Fulton

(57) ABSTRACT

Optical constructions are disclosed. A disclosed optical construction includes first and second optical layers having first and second major surfaces that face each other and are separated by an air gap. The first and second surfaces are susceptible to physically contacting each other at a location in the air gap. The optical construction further includes an optical film that is disposed at the location to prevent the first and second major surfaces from contacting each other at the location. The optical film has an effective index of refraction that is not greater than about 1.3.

24 Claims, 3 Drawing Sheets

(56) References Cited

U.S. PATENT DOCUMENTS

| | | |
|---|---|---|
| 4,025,159 A | 5/1977 | McGrath |
| 4,127,693 A | 11/1978 | Lemelson |
| 4,202,600 A | 5/1980 | Burke |
| 4,243,618 A | 1/1981 | Van Arnam |
| 4,478,769 A | 10/1984 | Pricone |
| 4,539,256 A | 9/1985 | Shipman |
| 4,588,258 A | 5/1986 | Hoopman |
| 4,618,518 A | 10/1986 | Pricone |
| 4,656,072 A | 4/1987 | Coburn, Jr. |
| 4,672,089 A | 6/1987 | Pricone |
| 4,726,706 A | 2/1988 | Attar |
| 4,726,989 A | 2/1988 | Mrozinski |
| 4,775,219 A | 10/1988 | Appeldorn |
| 4,801,193 A | 1/1989 | Martin |
| 4,906,070 A | 3/1990 | Cobb, Jr. |
| 5,056,892 A | 10/1991 | Cobb, Jr. |
| 5,120,594 A | 6/1992 | Mrozinski |
| 5,156,863 A | 10/1992 | Pricone |
| 5,229,882 A | 7/1993 | Rowland |
| 5,238,623 A | 8/1993 | Mrozinski |
| 5,528,720 A | 6/1996 | Winston |
| 5,614,286 A | 3/1997 | Bacon, Jr. |
| 5,691,846 A | 11/1997 | Benson, Jr. |
| 5,711,589 A | 1/1998 | Oe |
| 5,743,981 A | 4/1998 | Lu |
| 5,759,468 A | 6/1998 | Smith |
| 5,804,610 A | 9/1998 | Hamer |
| 5,808,713 A | 9/1998 | Broer |
| 5,831,766 A | 11/1998 | Martin |
| 5,882,796 A | 3/1999 | Wilson |
| 5,930,041 A | 7/1999 | Thielman |
| 5,946,134 A | 8/1999 | Benson |
| 5,959,774 A | 9/1999 | Benson |
| 5,992,066 A | 11/1999 | Brauer |
| 5,993,954 A | 11/1999 | Radovanovic |
| 6,004,422 A | 12/1999 | Janovec |
| 6,132,861 A | 10/2000 | Kang |
| 6,139,158 A | 10/2000 | Nilsen |
| 6,166,855 A | 12/2000 | Ikeyama |
| 6,204,202 B1 | 3/2001 | Leung |
| 6,210,858 B1 | 4/2001 | Yasuda |
| 6,224,223 B1 | 5/2001 | Higuchi |
| 6,224,792 B1 | 5/2001 | Janovec |
| 6,231,797 B1 | 5/2001 | Bernard |
| 6,254,675 B1 | 7/2001 | Aldinger |
| 6,285,001 B1 | 9/2001 | Fleming |
| 6,287,670 B1 | 9/2001 | Benson et al. |
| 6,325,515 B1 | 12/2001 | Coderre |
| 6,350,035 B1 | 2/2002 | Smith |
| 6,355,759 B1 | 3/2002 | Sherman |
| 6,368,699 B1 | 4/2002 | Gilbert |
| 6,376,590 B2 | 4/2002 | Kolb |
| 6,383,559 B1 | 5/2002 | Nakamura |
| 6,457,823 B1 | 10/2002 | Cleary |
| 6,461,724 B1 | 10/2002 | Radovanovic |
| 6,573,305 B1 | 6/2003 | Thunhorst |
| 6,656,571 B2 | 12/2003 | Benson |
| 6,677,028 B1 | 1/2004 | Lasch |
| 6,703,463 B2 | 3/2004 | Holguin |
| 6,719,426 B2 | 4/2004 | Magarill |
| 6,843,571 B2 | 1/2005 | Sewall |
| 6,846,089 B2 | 1/2005 | Stevenson |
| 6,884,371 B2 | 4/2005 | Smith |
| 6,890,642 B2 | 5/2005 | Kaminsky |
| 6,899,944 B2 | 5/2005 | Tanaka |
| 6,917,400 B2 | 7/2005 | Nakamura |
| 6,958,860 B2 | 10/2005 | Dontula |
| 6,967,053 B1 | 11/2005 | Mullen |
| 6,984,429 B2 | 1/2006 | Thunhorst |
| 7,027,671 B2 | 4/2006 | Huck |
| 7,068,910 B2 | 6/2006 | Duine |
| 7,072,544 B2 | 7/2006 | Cornelissen |
| 7,132,136 B2 | 11/2006 | Laney |
| 7,157,839 B2 | 1/2007 | Ouderkirk |
| 7,195,360 B2 | 3/2007 | Bacon, Jr. |
| 7,204,616 B2 | 4/2007 | Kitamura |
| 7,208,206 B2 * | 4/2007 | Hieda et al. .................. 428/1.5 |
| 7,251,079 B2 | 7/2007 | Capaldo |
| 7,261,424 B2 | 8/2007 | Smith |
| 7,293,884 B2 | 11/2007 | Sawayama |
| 7,309,135 B2 | 12/2007 | Smith |
| 7,327,415 B2 | 2/2008 | Brickey |
| 7,347,571 B2 | 3/2008 | Bacon, Jr. |
| 7,372,075 B2 | 5/2008 | Shigemura |
| 7,422,334 B2 | 9/2008 | Smith |
| 7,466,373 B2 | 12/2008 | Xu |
| 7,547,105 B2 | 6/2009 | Bacon, Jr. |
| 7,611,251 B2 | 11/2009 | Thakkar |
| 7,980,710 B2 | 7/2011 | Hayashi |
| 8,092,904 B2 * | 1/2012 | Pellerite et al. .............. 428/323 |
| 8,223,295 B2 * | 7/2012 | Sato et al. .................... 349/61 |
| 2002/0034457 A1 | 3/2002 | Reichert |
| 2002/0061178 A1 | 5/2002 | Winston |
| 2003/0100637 A1 | 5/2003 | Mimura |
| 2003/0118750 A1 | 6/2003 | Bourdelais |
| 2003/0170442 A1 | 9/2003 | Kaminsky |
| 2004/0056994 A1 | 3/2004 | Honda |
| 2004/0164325 A1 | 8/2004 | Siegel |
| 2004/0233526 A1* | 11/2004 | Kaminsky et al. ............ 359/452 |
| 2006/0003178 A1 | 1/2006 | Strobel |
| 2006/0019114 A1 | 1/2006 | Thies |
| 2006/0078696 A1 | 4/2006 | Furholz |
| 2006/0082700 A1 | 4/2006 | Gehlsen |
| 2006/0193040 A1 | 8/2006 | Kim |
| 2006/0215079 A1 | 9/2006 | Suzuki |
| 2006/0216455 A1 | 9/2006 | Soaft |
| 2006/0246233 A1 | 11/2006 | Fukuda |
| 2006/0275595 A1 | 12/2006 | Thies |
| 2007/0020404 A1 | 1/2007 | Seiberle |
| 2007/0065638 A1 | 3/2007 | Wang |
| 2007/0121211 A1 | 5/2007 | Watanabe |
| 2007/0189038 A1 | 8/2007 | Pokorny |
| 2007/0201246 A1 | 8/2007 | Yeo |
| 2008/0037127 A1 | 2/2008 | Weber |
| 2008/0043490 A1 | 2/2008 | Coleman |
| 2008/0064133 A1 | 3/2008 | Lee |
| 2008/0151375 A1 | 6/2008 | Lin |
| 2008/0192352 A1 | 8/2008 | Laney |
| 2008/0198446 A1* | 8/2008 | Asakura et al. .............. 359/352 |
| 2008/0220554 A1 | 9/2008 | Shigemura |
| 2008/0248312 A1 | 10/2008 | Thies |
| 2008/0303777 A1 | 12/2008 | Inoue |
| 2008/0305282 A1 | 12/2008 | Inakura |
| 2009/0029145 A1 | 1/2009 | Thies |
| 2009/0122405 A1 | 5/2009 | Mimura |
| 2009/0209028 A1 | 8/2009 | Dong |
| 2010/0103521 A1 | 4/2010 | Smith |

FOREIGN PATENT DOCUMENTS

| | | |
|---|---|---|
| EP | 2131218 | 12/2009 |
| GB | 1476447 | 6/1977 |
| GB | 2254826 | 10/1992 |
| JP | 6347621 | 12/1994 |
| JP | 2004-271568 | 9/2004 |
| JP | 2005-266343 | 9/2005 |
| WO | WO 94/20871 | 9/1994 |
| WO | WO 2004-027474 | 4/2004 |
| WO | WO 2005-052557 | 6/2005 |
| WO | WO 2006-076320 | 7/2006 |
| WO | WO 2006-096258 | 9/2006 |
| WO | WO 2006-120638 | 11/2006 |
| WO | WO 2006-124588 | 11/2006 |
| WO | WO 2008-011919 | 1/2008 |
| WO | WO 2008/090821 | 7/2008 |
| WO | WO 2008-098872 | 8/2008 |
| WO | WO 2008-144136 | 11/2008 |
| WO | WO 2008-144644 | 11/2008 |
| WO | WO 2008-144656 | 11/2008 |
| WO | WO 2010-059566 | 5/2010 |
| WO | WO 2010-059568 | 5/2010 |
| WO | WO 2010-059579 | 5/2010 |
| WO | WO 2010-059614 | 5/2010 |
| WO | WO 2010-120422 | 10/2010 |

(56) References Cited

FOREIGN PATENT DOCUMENTS

| WO | WO 2010-120468 | 10/2010 |
|---|---|---|
| WO | WO 2010-120845 | 10/2010 |
| WO | WO 2010-120864 | 10/2010 |
| WO | WO 2010-120971 | 10/2010 |
| WO | WO 2010-121019 | 10/2010 |
| WO | WO 2010-121054 | 10/2010 |
| WO | WO 2011-129831 | 10/2011 |
| WO | WO 2011-129832 | 10/2011 |
| WO | WO 2011-129833 | 10/2011 |

OTHER PUBLICATIONS

ASTM D 4956-07, "Standard Specification for Retroreflective Sheeting for Traffic Control" 2007, pp. 504-515.
ASTM E 808-01 (Reapproved 2009), "Standard Practice for Describing Retroreflection", 2001, pp. 1-10.
ASTM E 810-03 (Reapproved 2008) "Standard Test Method for Coefficient of Retroreflection of Retroreflective Sheeting Utilizing the Coplanar Geometry", 2003, pp. 1-8.
Boisvert, "Influence of Structural Properties of Nanoporous Silica-polymer Materials on Ink Absorption", Nordic Pulp and Paper Research Journal, 2003, vol. 18, No. 2, pp. 210-216.
Brunauer, "Adsorption of Gases in Multimolecular Layers", The Bureau of Chemistry and Soils and George Washington University Feb. 1938, vol. 60, pp. 309-319.
Cornelissen, "Efficient and Cost-effective Polarized-light backlights for LCDs", Proceedings of SPIE, vol. 7058, pp. 1-10, (2008).
Groh, "What is the Lowest Refractive Index of an Organic Polymer?", Macromolecules, 1991, vol. 24, No. 25, pp. 6660-6663.
Haze, "Insight on Color", Applications Note, Jun. 2008, vol. 9, No. 6, pp. 1-4.
Ibn-Elhaj, Optical Polymer Thin Films with Isotropic and Anisotropic Nano-corrugated Surface Topologies, Nature, Apr. 12, 2001, vol. 410, pp. 796-799.
Miyamoto, "Control of Refractive Index of Pressure-Sensitive Adhesives for the Optimization of Multilayered Media", Japanese Journal of Applied Physics, vol. 46, pp. 3978-3980, 2007.
Oliveri, "Fabrication and Characterization of Polymeric Optical Waveguides Using Standard Silicon Processing Technology", IEEE Xplore, Jun. 2005, pp. 1-6.
Patton, "Paint Flow and Pigment Dispersion: A Rheological Approach to Coating and Ink Technology", 2nd Edition, pp. 126-180 (1978).
Peng, "Enhanced Coupling of Light from Organic Light Emitting Diodes Using Nanopourous Films", Journal Applied Physics, Aug. 1, 2004, vol. 96, No. 3, pp. 1649-1654.
Polymer Handbook, edited by Bandrup, Immergut, and Grulke, 4th Edition, Parts I-VIII (1999).
Shen, "Low Dielectric Constant Silica Films with Ordered Nanoporous Structure", Materials Science and Engineering, 2007, C 27, pp. 1145-1148.
Smith, "Driver-focused Design of Retroreflective Sheeting for Traffic Signs", 87th Annual Meeting of Transportation Research Board, pp. 1-17, Jan. 13-17, 2008.
Sudduth, "Modeling Cluster Voids and Pigment Distribution to Predict Properties and CPVC in Coatings", Part 1: Dry Coating Analysis, Pigment and Resin Technology, 2008, vol. 37, No. 6, pp. 375-388.
"Visual Acuity", NDT Resource Center, Iowa State University [online], [retrieved from the internet on Jun. 24, 2011], URL <http://www.ndt.org/EducationResources/CommunityCollege/Penetrant-Test/Introduction/ visualacuity.htm>, 3 pages.
"Visual Acuity", Wikipedia, [online], [retrieved from the internet on Jun. 24, 2011], URL <http://en.wikipedia.org/wiki/Visual_acuity#Visual_acuity_expression>, 13 pages.
Walheim, "Nanophase-Separated Polymer Films as High-performance Antireflection Coatings", Science, Jan. 22, 1999, vol. 283, pp. 520-522.
Yoder, Jr., "Study of Light Deviation Errors in Triple Mirrors and Tetrahedral Prisms", Journal of Optical Society of America, Jul. 1958, vol. 48, No. 7, pp. 496-499.
Yu, "Comparison of Different Measurement Methods for Transmittance Haze", Metrologia, vol. 46, pp. 233-237, (2009). (XP002603289).
International Search Report, PCT/US2010/030984, mailed Oct. 14, 2010, 5 pages.
International Search Report, PCT/US2010/031019, mailed Aug. 4, 2010, 7 pages.
International Search Report, PCT/US2010/031149, mailed Jun. 22, 2010, 6 pages.
International Search Report, PCT/US2010/031225, mailed Aug. 23, 2010, 4 pages.
International Search Report, PCT/US2010/031276, mailed Jun. 18, 2010, 2 pages.
International Search Report, PCT/US2010/031284, mailed Jun. 18, 2010, 2 pages.
International Search Report, PCT/US2010/031290, 3 pages.
International Search Report, PCT/US2010/031298, mailed Jun. 18, 2010, 3 pages.

* cited by examiner

OPTICAL FILM FOR PREVENTING OPTICAL COUPLING

CROSS REFERENCE TO RELATED APPLICATIONS

This application is a national stage filing under 35 U.S.C. 371 of PCT/US2010/031019, filed on Apr. 14, 2010, which claims priority to U.S. Provisional Application No. 61/169,549, filed on Apr. 15, 2009, the disclosure of which is incorporated by reference in its/their entirety herein.

RELATED APPLICATIONS

This application is related to the following U.S. patent applications, filed on even date herewith and which are incorporated by reference: U.S. Provisional Application No. 61/169,466, titled "Optical Film"; U.S. Provisional Application No. 61/169,521, titled "Optical Construction and Display System Incorporating Same"; U.S. Provisional Application No. 61/169,532, titled "Retroreflecting Optical Construction"; U.S. Provisional Application No. 61/169,555, titled "Backlight and Display System Incorporating Same"; U.S. Provisional Application No. 61/169,427, titled "Process and Apparatus for Coating with Reduced Defects"; and U.S. Provisional Application No. 61/169,429, titled "Process and Apparatus for A nanovoided Article".

FIELD OF THE INVENTION

This invention generally relates to optical constructions and display systems that include a low-index optical film for preventing optical loss or undesirable optical coupling between two layers or components that are separated by an air gap.

BACKGROUND

Liquid crystal display systems typically include multiple layers such as one or more diffuser layers, one or more prismatic layers for redirecting light, and one or more reflective and/or absorbing polarizer layers. At lease some of these films are separated from each other by air gaps. When two such films come into physical contact with each other, light can optically couple between the two films at the contact location. The optical coupling often results in undesirable visibly apparent bright spots or streaks in the display.

SUMMARY OF THE INVENTION

Generally, the invention relates to optical constructions and display systems. In one embodiment, an optical construction includes first and second major surfaces that face each other and are separated by an air gap. The first and second surfaces are susceptible to physically contacting each other at a first location in the air gap. The optical construction includes an optical film that is disposed at the first location. The optical film prevents the first and second major surfaces from contacting each other at the first location. The optical film has an effective index of refraction that is not greater than about 1.3. In some cases, the optical film includes a binder, a plurality of particles and a plurality of interconnected voids. In some cases, the optical film has an effective index of refraction that is not greater than about 1.2, or not greater than about 1.1.

In another embodiment, an optical assembly includes a first optical layer, and an optical construction that includes a second optical layer and an optical film that is disposed between the first and second optical layers. The optical film has an effective index of refraction that is not greater than about 1.3. Substantial portions of each two neighboring major surfaces in the optical construction are in physical contact with each other. The optical assembly further includes an air gap that is disposed between the first optical layer and the optical construction. When the first optical layer is brought into physical contact with the optical film, no optical coupling occurs between the first and second optical layers. In some cases, at least one of the first and second optical layers is a prismatic light redirecting layer or a reflective polarizer layer. In some cases, the optical film includes a binder, a plurality of particles and a plurality of interconnected voids. In some cases, the optical film has an effective index of refraction that is not greater than about 1.2, or not greater than about 1.1. In some cases, the optical film has an optical haze that is not greater than about 1%. In some cases, at least 50%, or at least 70%, or at least 90%, of each two neighboring major surfaces in the optical construction are in physical contact with each other. In some cases, the optical film is coated on the second optical layer. In some cases, the optical film has a minimum thickness that is not less than about 1 micron.

In another embodiment, a display system includes a light source, a liquid crystal panel that receives light from the light source, a first major surface that is disposed between the liquid crystal panel and the light source, a second major surface that is disposed between the first major surface and the light source, an air gap that separates the first and second major surfaces, and an optical film that is disposed between the first and second major surfaces. The optical film prevents the two major surfaces from physically contacting each other. The optical film includes a binder, a plurality of particles and a plurality of interconnected voids. In some cases, at least one of the first and second major surfaces is a major surface of a prismatic light redirecting layer or a reflective polarizer layer. In some cases, the optical film has a thickness that is not less than about 1 micron.

In another embodiment, a light source includes a lightguide, one or more lamps that are disposed along an edge of the light guide, and an optical film that is disposed on at least a portion of the lightguide. The optical film preventing optical loss when the lightguide comes into physical contact with an object. The optical film has a thickness that is not less than about 1 micron and an effective index of refraction that is not greater than about 1.3. In some cases, the optical film has an effective index of refraction that is not greater than about 1.2. In some cases, the optical film includes a plurality of particles and a plurality of voids that are dispersed in a first medium. The optical film has an effective index of refraction that is less than an index of refraction of the first medium.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

Figure 1:
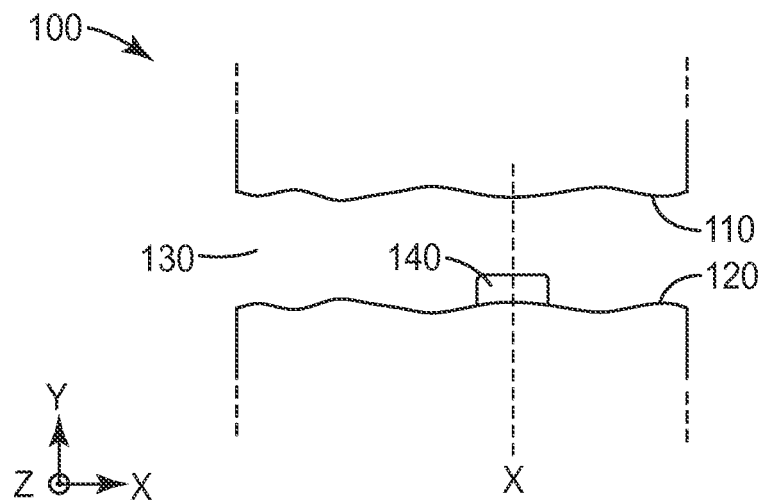
FIG. 1 is a schematic side-view of an optical construction.

This invention generally relates to optical constructions and display systems that include a low-index optical film for preventing optical coupling between two layers that are separated by an air gap, but are susceptible to physically contacting each other. The invention also relates to optical assemblies that include a low-index optical film for preventing physical contact that can lead to optical loss.

Some disclosed optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided optical film enhancing internal reflection (EIR), it is meant that the reflectance at the boundary of the voided and non-voided strata of the film or film laminate is greater with the voids than without the voids.

Some disclosed optical films include a plurality of sufficiently small voids dispersed in a binder and have a substantially reduced effective index. The voids in the disclosed optical films have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of an optical film with light, such as light that is incident on, or propagates in, the optical film, depends on a number of film characteristics such as, for example, the film thickness, the binder index, the void or pore index, the pore shape and size, the spatial distribution of the pores, and the wavelength of light. In some cases, light that is incident on or propagates within the optical film, "sees" or "experiences" an effective index that can be expressed in terms of the void index $n_v$, the binder index $n_b$, and the void porosity or volume fraction "f". In such cases, the optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on a disclosed optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the optical film has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed optical films are sufficiently thick so that the optical film can reasonably have an effective index that can be expressed in terms of the indices of refraction of the voids and the binder, and the void or pore volume fraction or porosity. In such cases, the thickness of the optical film is not less than about 100 nm, or not less than about 200 nm, or not less than about 500 nm, or not less than about 700 nm, or not less than about 1,000 nm.

When the voids in a disclosed optical film are sufficiently small and the optical film is sufficiently thick, the optical film has an effective permittivity $\epsilon_{eff}$ that can be expressed as:

$$\epsilon_{eff} = f\epsilon_v + (1-f)\epsilon_b \qquad (1)$$

In such cases, the effective index $n_{eff}$ of the optical film can be expressed as:

$$n_{eff}^2 = fn_v^2 + (1-f)n_b^2 \qquad (2)$$

In some cases, such as when the difference between the indices of refraction of the pores and the binder is sufficiently small, the effective index of the optical film can be approximated by the following expression:

$$n_{eff} = fn_v + (1-f)n_b \qquad (3)$$

In such cases, the effective index of the optical film is the volume weighted average of the indices of refraction of the voids and the binder. For example, an optical film that has a void volume fraction of about 50% and a binder that has an index of refraction of about 1.5, has an effective index of about 1.25.

FIG. 1 is a schematic side-view of an optical construction 100 that includes a first major surface 110 that is separated from a neighboring second major surface 120 by an air gap 130. Major surfaces 110 and 120 are susceptible to physically contacting each other in the air gap. For example, the two surfaces can physically contact each other because of the size, weight, or curl of the layer associated with first major surface 110. In particular, the two major surfaces are susceptible to physically contact each other at one or more locations in the air gap, such as a location "X" within the gap. Optical construction 100 includes an optical film 140 disposed on second major surface 120 at location "X" in air gap 130. In some cases, the optical film can be disposed on first major surface 110 at location "X". In some cases, one optical film can be disposed on first major surface 110 at location "X" and another optical film can be disposed on second major surface 120 at the same location "X". Optical film 140 prevents the first and second major surfaces from physically contacting each other at the first location "X". As used herein, by "physical contact" between the two major surfaces it is meant that the distance between the two surface at the contact point is less than about a wavelength of light. For example, the two surfaces physically contact one another if the distance between the two surfaces is less than about 0.7 microns, or less than about 0.6 microns, or less than about 0.5 microns, or less than about 0.4 microns, or less than about 0.3 microns. For a separation distance less than about one wavelength of light, light that undergoes total internal reflection (TIR) at one of the two major surfaces, can evanescently optically couple across the two surfaces.

In some cases, optical film 140 can be coated on or laminated to major surface 120. In some cases, optical film 140 has a sufficiently low index so that it can support or maintain TIR at second major surface 120. For example, in such cases, the optical film has an effective index of refraction that is not greater than about 1.35, or not greater than about 1.3, or not greater than about 1.25, or not greater than about 1.2, or not greater than about 1.15, or not greater than about 1.1.

Optical film 140 can be any optical film that has a sufficiently low index of refraction, such as those described in co-pending U.S. Provisional Application No. 61/169,466, titled "OPTICAL FILM", filed on the same date as the present application, the disclosure of which is incorporated in its entirety herein by reference.

In some cases, optical film 140 includes a binder, a plurality of particles and a plurality of interconnected voids. The film porosity or the volume fraction of the plurality of interconnected voids in the optical film is not less than about 20%, or not less than about 30%, or not less than about 40%, or not less than about 50%, or not less than about 60%, or not less than about 70%, or not less than about 80%. The weight ratio of the binder to the plurality of interconnected voids is not less than about 1:1, or not less than about 1.5:1, or not less than about 2:1, or not less than about 2.5:1, or not less than about 3:1, or not less than about 3.5:1, or not less than about 4:1. In some cases, the optical film has a substantially low optical haze. For example, in such cases, the optical haze of the optical film is not greater than about 10%, or not greater than about 7%, or not greater than about 5%, or not greater than about 3%, or not greater than about 2%, or not greater than about 1.5%, or not greater than about 1%. In some cases, the particles in the optical film can be approximately spherical. In some cases, the particles can be elongated.

In some cases, optical film 140 is porous and has a high optical haze and, at the same time, it can maintain or support TIR at second major surface 120. For example, in such cases, optical film 140 has an optical haze that is not less than about 30%, or not less than about 40%, or not less than about 70%, or not less than about 80%, or not less than about 90%, or not less than about 95%.

Figure 2:
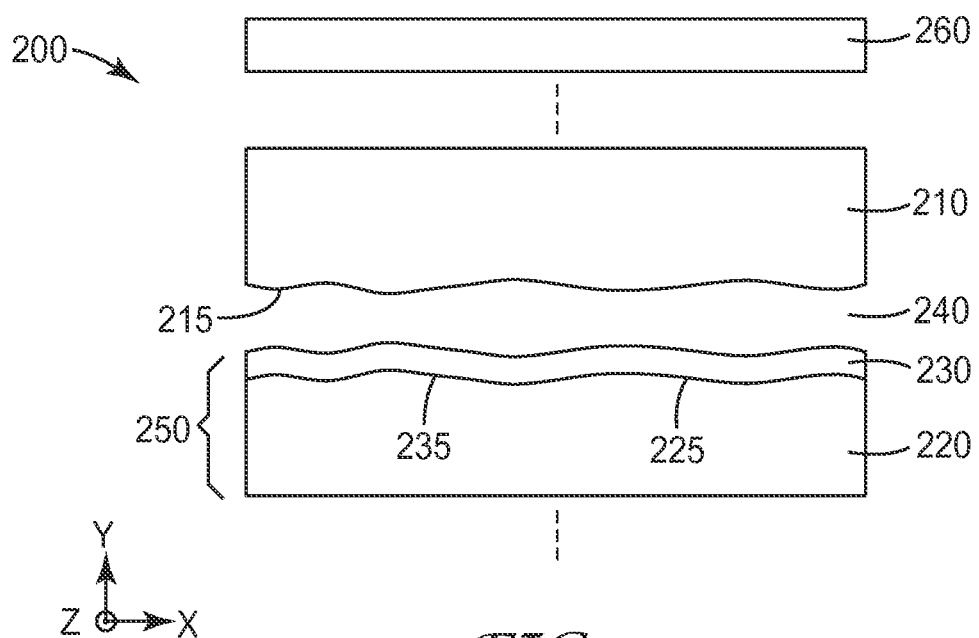
FIG. 2 is a schematic side-view of an optical assembly.

FIG. 2 is a schematic side-view of an optical assembly 200 that includes a liquid crystal panel 260, a first optical layer 210 having a major surface 215, and an optical construction 250 that is separated from the first optical layer by an air gap 240. Optical construction 250 includes a second optical layer 220 and an optical film 230 disposed on the second optical layer. Air gap 240 separates the optical film from the first optical layer.

When first optical layer 210 is brought into physical contact with optical film 230, no, or very little, optical coupling occurs between first optical layer 210 and second optical layer 220.

Substantial portions of neighboring major surfaces of each two neighboring layers in optical construction 250 are in physical contact with each other. For example, substantial portions of neighboring major surfaces 235 and 225 of respective neighboring layers 230 and 220 in optical construction 250 are in physical contact with each other. For example, at least 50%, or at least 60%, or at least 70%, or at least 80%, or at least 90%, or at least 95% of the two neighboring major surfaces are in physical contact with each other. In some cases, optical film 230 is coated on surface 225 of second optical layer 220.

In general, substantial portions of neighboring major surfaces (major surfaces that face each other or are adjacent to each other) of each two neighboring layers in optical construction 250 are in physical contact with each other. For example, in some cases, there may be one or more additional layers, not expressly shown in FIG. 2, disposed between optical film 230 and second optical layer 220. In such cases, substantial portions of neighboring major surfaces of each two neighboring layers in optical construction 250 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

In some cases, optical film 230 has a substantially reduced effective index. For example, in such cases, the index of refraction of the optical film is not greater than about 1.3, or not greater than about 1.25, or not greater than about 1.2, or not greater than about 1.15, or not greater than about 1.1.

Optical film 230 can have any optical haze that may be desirable in an application. For example, in some cases, optical film 230 can have an optical haze that is not greater than about 2%, or greater than about 1.5%, or greater than about 1%. As another example, in some cases, optical film 230 can have an optical haze that is not less than about 30%, or not less than about 40%, or not less than about 50%, or not less than about 60%, or not less than about 70%, or not less than about 80%, or not less than about 90%, or not less than about 95%.

In general, first and second optical layers 210 and 220 can be any optical layers that may be desirable in an optical assembly 200. For example, in some cases, at least one of the first and second optical layers can be a prismatic light redirecting layer, a brightness enhancement film, or a reflective polarizer layer. Optical film 230 can be any optical film disclosed herein. For example, optical film 230 can be similar to optical film 140.

In some cases, such as when optical film 230 prevents any optical coupling between the first and second optical layers, the thickness of the optical film is not less than about 1 micron, or not less than about 1.2 microns, or not less than about 1.4 microns, or not less than about 1.6 microns, or not less than about 1.8 microns, or not less than about 2 microns.

Figure 3:
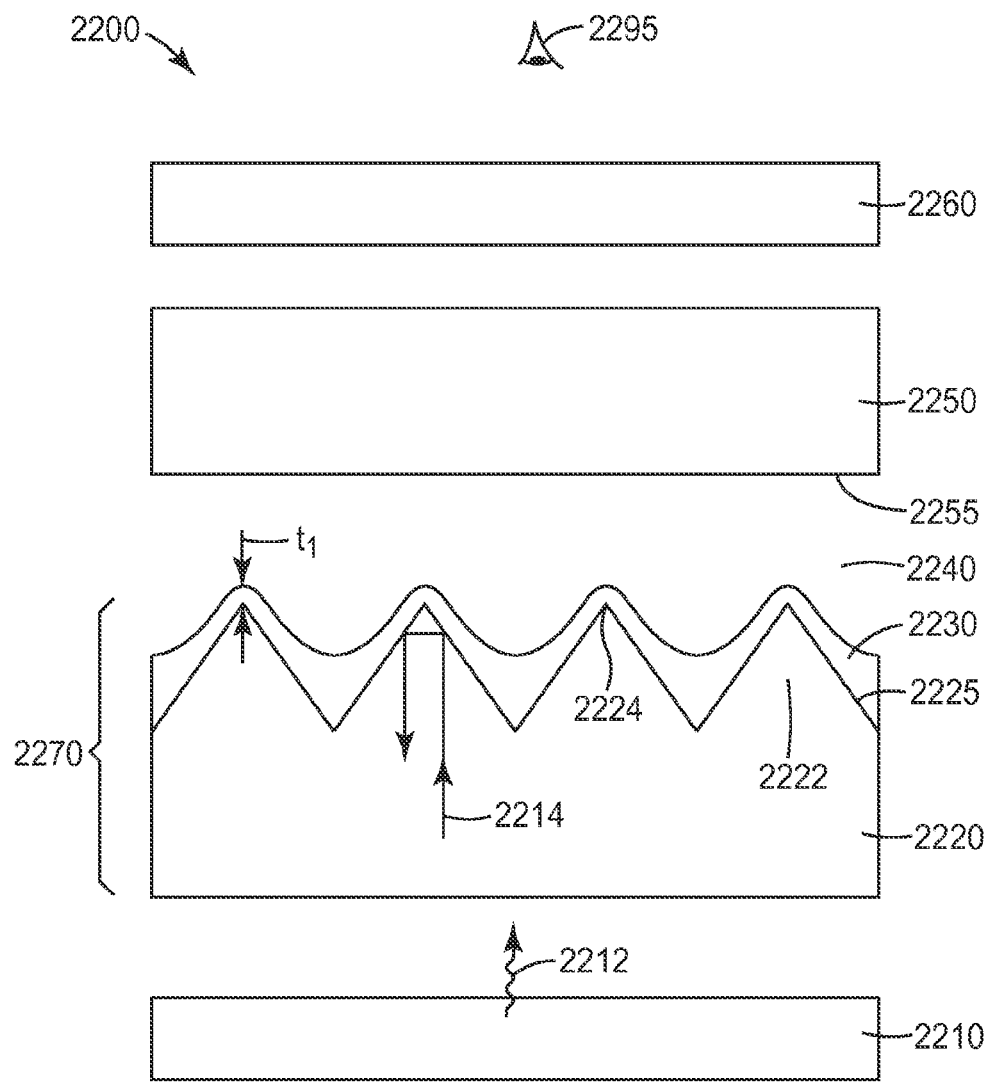
FIG. 3 is a schematic side-view of a display system.

FIG. 3 is a schematic side-view of a display system 2200 that includes a light source 2210 emitting light 2212, an optical construction 2270 receiving the emitted light, an optical layer 2250 disposed on the optical construction and having a planar bottom major surface 2255 facing the optical construction, and a liquid crystal panel 2260 disposed on the optical layer. An air gap 2240 is disposed between and separates optical layer 2250 and optical construction 2270.

Optical construction 2270 includes a structured layer 2220 that includes a structured major surface 2225 and an optical film 2230 coated on the structured major surface. Structured major surface 2225 includes a plurality of structures 2222 each having a peak 2224.

Structures 2222 are designed to totally internally reflect certain light rays that structured layer 2220 receives from the light source. For example, a light ray 2214 that is incident on the structured major surface 2225 near a peak, is totally internally reflected by structures 2222. In the absence of optical film 2230, when planar major surface 2255 physically contacts the optical construction, at least a portion of light ray 2214 can transmit, or optically couple, to optical layer 2250 resulting in increased optical transmission near the peaks of structured layer 2220. This localized increased transmission is typically referred to as optical coupling or wet-out and can result in a viewer 2295 observing a visibly apparent and undesirable variation in light intensity across the display surface area of liquid crystal panel 2260. In the absence of optical film 2230, optical coupling or wet-out typically occurs where a peak of structured major surface 2225 physically contacts the adjacent optical layer 2250. Optical film 2230 is sufficiently thick so as to prevent the structured major surface 2225 from coming into physical contact with planar surface 2255. For example, the thickness $t_1$ of optical film 2230 at a peak of the structured major surface, a location at which layers 2250 and 2220 are susceptible to physically contacting each other, is not less than about 0.7 microns, or not less than about 1 micron, or not less than about 1.1 microns, or not less than about 1.2 microns, or not less than about 1.3 microns, or not less than about 1.4 microns, or not less than about 1.5 microns, or not less than about 1.7 microns, or not less than about 2 microns.

In some cases, the optical haze of optical film 2230 is not greater than about 5%, or not greater than about 4%, or not greater than about 3%, or not greater than about 2%, or not greater than about 1%.

Optical film 2230 can be any optical film disclosed herein. For example, optical film 2230 can be similar to optical film 140 or 230.

In some cases, optical film 2230 includes a plurality of particles and a plurality of voids dispersed in a first medium. The particles and the voids are sufficiently small to produce an effective medium that has an effective index of refraction $n_{eff}$ that is less than the index of refraction $n_b$ of the first medium, where the effective medium includes the voids, the particles, and the first medium. The effective index of refraction $n_{eff}$ of the optical film is sufficiently low so that light ray 2214 undergoes TIR at structured major surface 2225. For example, in such cases, $n_{eff}$ is not greater than about 1.3, or not greater than about 1.25, or not greater than about 1.2, or not greater than about 1.15, or not greater than about 1.1.

Structured layer 2220 can be any structured layer that may be desirable in an application. For example, in some cases, the structured layer can be a brightness enhancement film. As another example, in some cases, the structured layer can be a turning film.

In the exemplary optical system 2200, optical film 2230 is disposed on layer 2220. In some cases, optical film 2230 can be disposed on, for example, surface 2255 of optical layer 2250.

Display system 2200 includes first major surface 2255 that is disposed between liquid crystal panel 2260 and light source 2210, second major surface 2225 that is disposed between first major surface 2255 and light source 2210, air gap 2240 that separates the first and second major surfaces, and optical film 2230 that is disposed between the first and second major surfaces for preventing the two major surfaces from physically contacting each other. In some cases, optical film 2230 includes a binder, a plurality of particles and a plurality of interconnected voids.

In some cases, at least one of major surfaces 2255 and 2225 is a major surface of a prismatic light redirecting layer, a brightness enhancement film, or a reflective polarizer layer.

Figure 4:
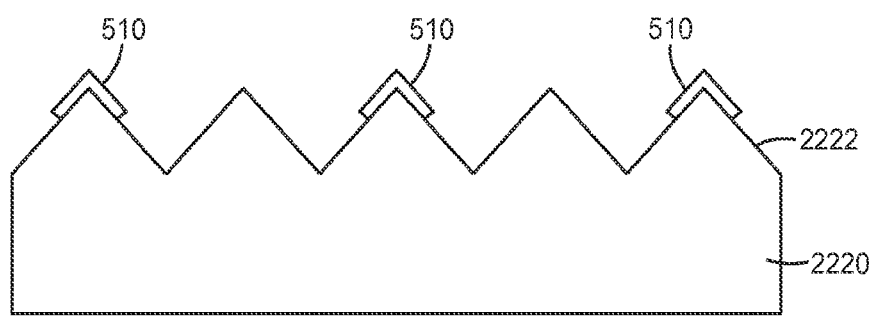
FIG. 4 is a schematic side-view of a patterned optical film.

In the exemplary display system 2200, optical film 2230 covers substantially the entire structured major surface 2225. In some cases, optical film covers only portions of the structured major surface. For example, FIG. 4 is a schematic side-view of a patterned optical film 510 that only covers some of the peaks of structured layer 2220. Optical film 510 can be similar to any optical film disclosed herein. In some cases, an optical film that is disposed in an air gap between two major surfaces need only separate those portions of the two major surfaces that are susceptible to physically contact each other.

Figure 5:
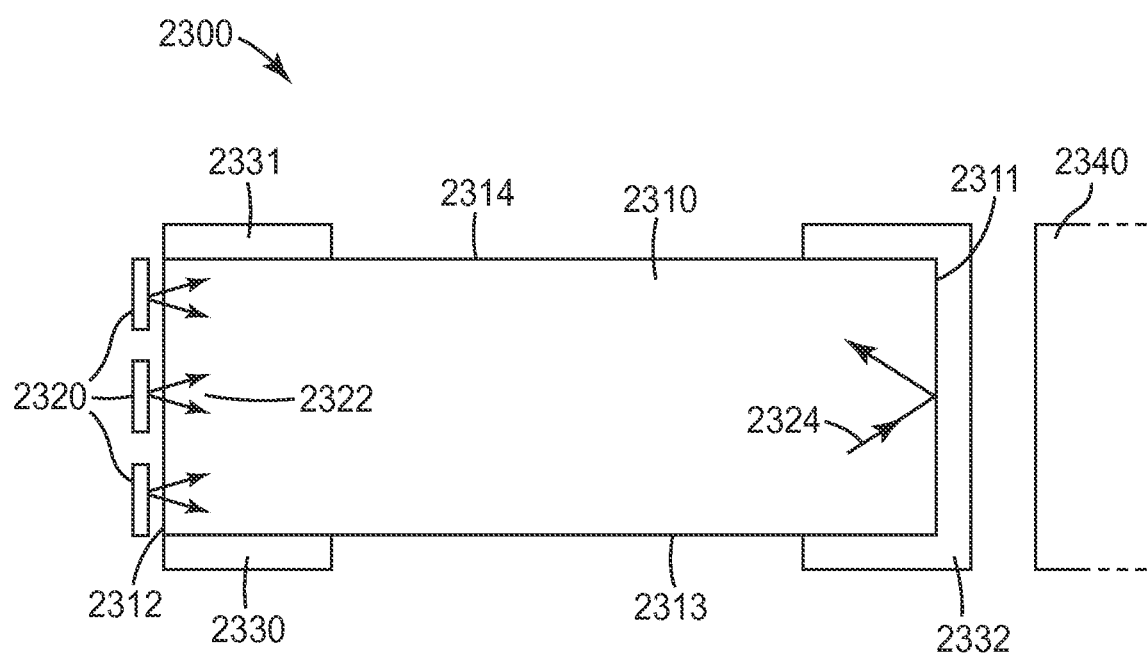
FIG. 5 is a schematic top-view of a light source.

FIG. 5 is a schematic top-view of a light source 2300 that includes a lightguide 2310, a plurality of lamps 2320 disposed along a left edge 2312 of the lightguide, a first optical film 2330 covering a portion of a bottom edge 2313 of the lightguide, a second optical film 2331 covering a portion of a top edge 2314 of the lightguide, and a third optical film 2332 covering a right edge 2311 and portions of the top and bottom edges of the lightguide.

Lamps 2320 emit light 2322 that enters into the lightguide 2310 from edge 2312 of the lightguide and propagates inside the lightguide by total internal reflection (TIR). During the operation of the light source in an application, lightguide 2310 can come into physical contact with an external object, such as, for example, a frame 2340 that may be housing and/or supporting the lightguide. The contact can result in optical loss due to, for example, at least partial frustration of TIR. Optical films 2330-2332 cover at least portions of the lightguide 2310 and prevent optical loss when the lightguide comes into physical contact with an object, such as frame 2340. The optical films are sufficiently thick to prevent optical loss by preventing, or substantially preventing, optical coupling between the lightguide and any external object. At the same time, the optical films are sufficiently thick and have sufficiently low indices of refractions to promote or maintain TIR of light rays, such as light ray 2324, in the lightguide.

The exemplary light source 2300 includes three optical films covering portions of the lightguide. In general, light source 2300 can have one or more optical films covering portions or all of the lightguide. As an example, the light source can have an optical film covering the top, bottom, and right edges of the light guide. In some cases, the entire lightguide can be coated with a sufficiently thick optical film.

The low index layers 2330-2332 can be any optical film or low index layer disclosed herein. In some cases, the optical films include a plurality of particles and a plurality of voids dispersed in a first medium. The particles and the voids are sufficiently small to produce an effective medium that has an effective index of refraction $n_{eff}$ that is less than the index of refraction $n_b$ of the first medium, where the effective medium includes the voids, the particles, and the first medium. The effective index of refraction $n_{eff}$ of the optical film is sufficiently low so that light ray 2324 undergoes TIR. For example, in such cases, $n_{eff}$ is not greater than about 1.3, or not greater than about 1.25, or not greater than about 1.2, or not greater than about 1.15, or not greater than about 1.1.

In some cases, an optical film in light source 2300 includes a plurality of particles and a plurality of voids dispersed in a binder. The optical film has an effective index of refraction that is smaller than the index of refraction of the binder.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if optical construction 100 in FIG. 1 is flipped as compared to the orientation in the figure, optical film 140 is still considered to be on "top" of major surface 120.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical construction comprising first and second optical layers having first and second major surfaces facing each other and being separated by an air gap, the first and second surfaces being susceptible to physically contacting each other at a location in the air gap, the optical construction comprising an optical film disposed at the location to prevent the first and second major surfaces from contacting each other at the location, the optical film having an effective index of refraction that is not greater than about 1.3.

2. The optical construction of claim 1, wherein the optical film comprises a plurality of voids.

3. The optical construction of claim 1, wherein the optical film comprises a binder, a plurality of particles and a plurality of interconnected voids.

4. The optical construction of claim 1, wherein the optical film has an effective index of refraction that is not greater than about 1.2.

5. The optical construction of claim 1, wherein the optical film has an effective index of refraction that is not greater than about 1.1.

6. An optical assembly comprising:
a first optical layer;
an optical construction comprising:
   a second optical layer; and
   an optical film disposed between the first and second optical layers and having an effective index of refraction that is not greater than about 1.3, wherein substantial portions of each two neighboring major surfaces of the second optical layer and the optical film in the optical construction are in physical contact with each other; and
an air gap disposed between the first optical layer and the optical construction, such that when the first optical layer is brought into physical contact with the optical film, no optical coupling occurs between the first and second optical layers.

7. The optical assembly of claim 6, wherein at least one of the first and second optical layers is a prismatic light redirecting layer or a reflective polarizer layer.

8. The optical assembly of claim 6, wherein the optical film comprises a binder, a plurality of particles and a plurality of interconnected voids.

9. The optical assembly of claim 6, wherein the optical film has an effective index of refraction that is not greater than about 1.2.

10. The optical assembly of claim 6, wherein the optical film has an effective index of refraction that is not greater than about 1.1.

11. The optical assembly of claim 6, wherein the optical film has an optical haze that is not greater than about 2%.

12. The optical assembly of claim 6, wherein the optical film has an optical haze that is not greater than about 1%.

13. The optical assembly of claim 6, wherein at least 50% of each two neighboring major surfaces in the optical construction are in physical contact with each other.

14. The optical assembly of claim 6, wherein at least 70% of each two neighboring major surfaces in the optical construction are in physical contact with each other.

15. The optical assembly of claim 6, wherein at least 90% of each two neighboring major surfaces in the optical construction are in physical contact with each other.

16. The optical assembly of claim 6, wherein the optical film is coated on the second optical layer.

17. The optical assembly of claim 6, wherein the optical film has a minimum thickness that is not less than about 1 micrometer.

18. The optical assembly of claim 6 further comprising a liquid crystal panel disposed on the first optical layer.

19. A display system comprising:
a light source;
a liquid crystal panel receiving light from the light source;
a first major surface of a first optical layer disposed between the liquid crystal panel and the light source;
a second major surface of a second optical layer disposed between the first major surface and the light source;
an air gap separating the first and second major surfaces; and
an optical film disposed between the first and second major surfaces for preventing the two major surfaces from physically contacting each other, the optical film comprising a binder, a plurality of particles and a plurality of interconnected voids.

20. The display system of claim 19, wherein at least one of the first and second major surfaces is a major surface of a prismatic light redirecting layer or a reflective polarizer layer.

21. The display system of claim 19, wherein the optical film has a thickness that is not less than about 1 micron.

22. A light source comprising:
a lightguide;
one or more lamps disposed along an edge of the light guide; and
an optical film disposed on at least a portion of the lightguide for preventing optical loss when the lightguide comes into physical contact with an object, the optical film having a thickness that is not less than about 1 micron, and an effective index of refraction that is not greater than about 1.3.

23. The light source of claim 22, wherein the optical film has an effective index of refraction that is not greater than about 1.2.

24. The light source of claim 22, wherein the optical film comprises a plurality of particles and a plurality of voids dispersed in a medium, the optical film having an effective index of refraction that is less than an index of refraction of the medium.

* * * * *